May 16, 1967
J. F. LASH
3,319,470
BALANCING SYSTEM
Filed June 19, 1964
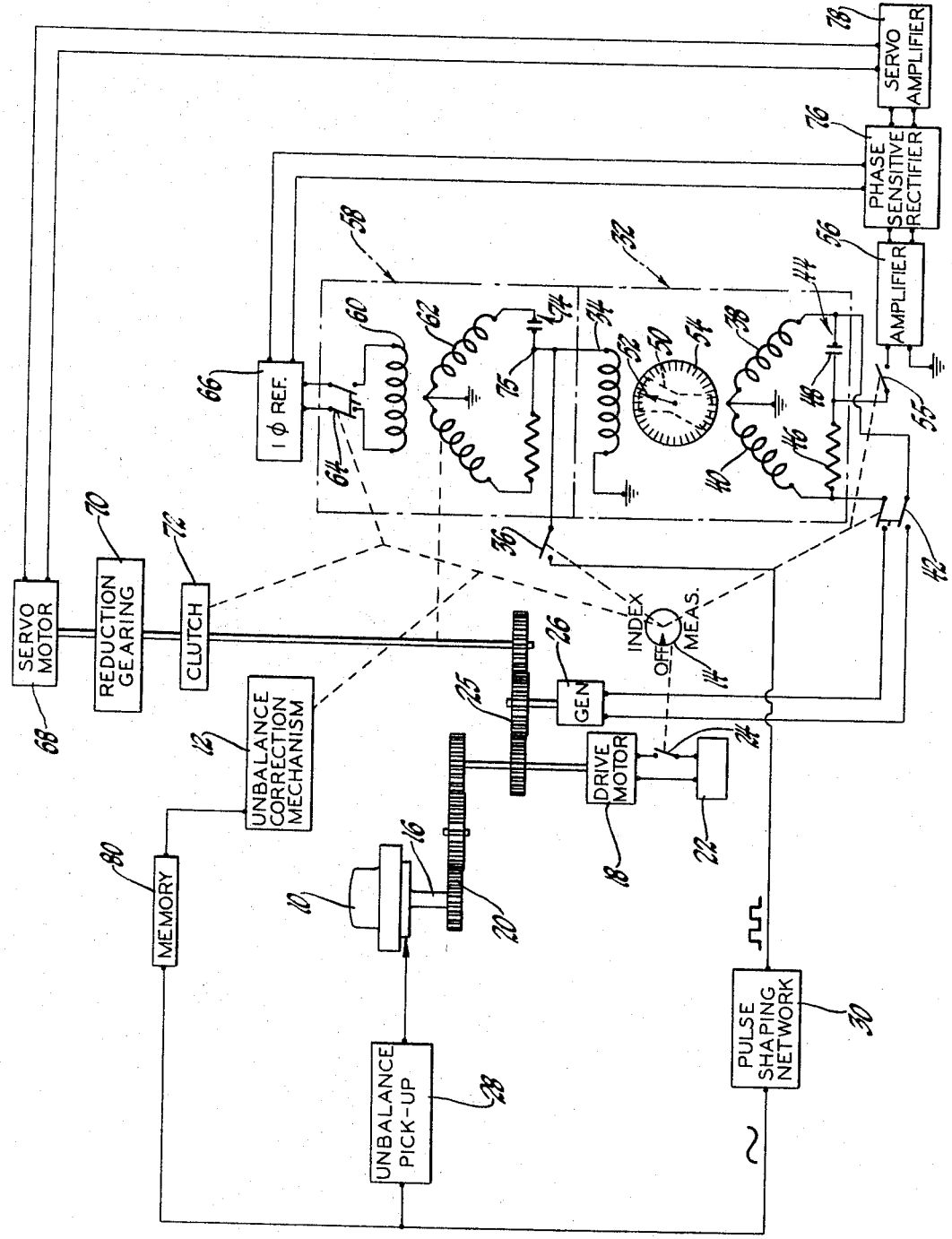
INVENTOR.
Joseph F. Lash
BY
Hugh L. Fisher
ATTORNEY

United States Patent Office 3,319,470
Patented May 16, 1967

3,319,470
BALANCING SYSTEM
Joseph F. Lash, Ferndale, Mich., assignor to General Motors Corporation, Detroit, Mich., a corporation of Delaware
Filed June 19, 1964, Ser. No. 376,368
13 Claims. (Cl. 73—462)

This invention relates to improvements in balancing systems, and in particular to apparatus for determining where on a workpiece an unbalance correction should be made and what the correction should be.

The controls for automatic balancing systems usually employ either pulse or D.C. circuits. These pulse circuits are often upset by transients produced, e.g., by noise. Since noise is usually inherent in the customary environment for balancing machines, filtering provisions must be made in the circuits to eliminate the major noise induced transients. Other noise-induced transients are not so easily eliminated without resorting to costly and complex circuitry. The D.C. circuits are subject to drift, which is frequently caused by aging components, and therefore require provisions for continuously calibrating the circuits. Again, this involves additional cost as well as complexity.

Accordingly, novel apparatus is proposed for utilizing, during an unbalance measuring cycle of operation, magnetic fields reflecting certain unbalance correction information to induce magnetism in a movable magnetic member. The magnetic member then assumes a position that will be representative of the angular location of the unbalance in a workpiece.

Also contemplated by the invention is the utilization, during an indexing cycle, of the previously established position of the magnetic member for producing a transformer coupling action that will provide an error signal for use in producing a relative alignment of the workpiece and an unbalance correction mechanism so that the necessary unbalance correction can be made.

Another problem encountered when locating the unbalance concerns the range of operation. Obviously, the unbalance can occur anywhere within the 360° range of operation. Therefore, accuracy over this entire range is essential. This is difficult to achieve at and within the vicinity of the end points at 0° and 360°; in fact, the end points themselves are not easily distinguished.

The invention, therefore, comprehends the use of a rotating magnetic reference field that will make one revolution per each turn of the workpiece and thus in effect provide 360 angular degrees of an instrument scale corresponding to the 360 electrical degrees of one cycle. Another magnetic field indicates the angular location of the unbalance and, hence, the instantaneous values of these fields and their polarities will cause a movable magnetic member at the instant of maximum magnetism to align itself with the reference field and assume a position that indicates the angular position of the unbalance relative to an electrical zero reference, all within 360 angular degrees of total instrument scale. Subsequently, by developing in a transformer primary a reference field reflecting the actual position of the workpiece, the magnetic member can be employed to alter the transformer coupling with respect to the secondary and induce therein an error signal corresponding to the position of the unbalance relative to another reference, which can correspond to the location of an unbalance correction mechanism. This error signal can thereafter be used for indexing purposes.

The foregoing and other objects and advantages of the invention will become apparent from the following description and from the accompanying drawing in which the single figure is a schematic illustration of a balancing system incorporating the principles of the invention.

Referring now to the details of the system, the numeral 10 denotes a workpiece whose unbalance is to be determined during an unbalance measuring cycle and corrected by a suitable unbalance correction mechanism 12 after the completion of an indexing cycle. The unbalance correction mechanism 12 can either remove material, as by drilling, or add material, e.g., by welding. The cycle determination is made by a cycle controller 14, which will be described more in detail as the explanation proceeds.

The structure for carrying out the unbalance measuring cycle will first be considered. This is not intended to suggest that the structures for accomplishing each cycle of operation are distinct. Actually, as will become more apparent, there has been an advantageous use of some common parts of the structures for both cycles of operation. The workpiece 10 must, of course, be revolved at the proper speed to determine the unbalance characteristics. As is well known, while the workpiece 10 is rotating both static and dynamic unbalance can be measured. The rotation is achieved through a spindle 16 to which the workpiece 10 is releasably secured. Spindle 16 is revolved by an electric drive motor 18 through a 1:1 ratio drive unit 20 utilizing either gearing or some type of chain or link belt arrangement. The drive motor 18 derives power from a source 22, subject to the control of a motor switch 24. The drive motor 18 through gearing 25 also revolves a two-phase generator 26, necessarily at the same speed as the workpiece 10 is revolved, so as to develop a two-phase reference signal having a frequency corresponding to the rate of rotation of the workpiece 10 and a phase that reflects an electrical zero reference. This electrical zero reference for explanatory purposes can correspond to some imaginary reference point on the workpiece 10.

The unbalance characteristics of the workpiece 10 are sensed by a suitable unbalance pickup 28. The unbalance pickup 28 may by way of suggestion only be of the magnetic or photoelectric type and is so positioned relative to the spindle 16 as to develop in a known way an unbalance signal of sinusoidal wave form. As is well known, the unbalance signal's amplitude indicates the amount of unbalance, and its phase the angular location of the unbalance. Of course, the frequency of the unbalance signal will be the same as that of the reference signal.

The unbalance signal is next shaped into a square wave by a pulse shaping network 30. The pulse shaping network 30 is preferably a multivibrator adjusted to give a symmetrical square wave form output at the running frequency. Any commercially available multivibrator of a character that is triggered between two stable states by an incoming pulse, in this instance the sinusoidal wave shaped unbalance signal, can be used. Of course the parameters of the multivibrator must be selected to give a symmetrical square wave output having the same frequency as the unbalance signal. The advantage of such a multivibrator is that it will lock in at the frequency of the input unbalance signal even though of a very small amplitude.

Both the two-phased reference signal and the square wave shaped unbalance signal are supplied to what will be referred to as a phase controller, denoted generally at 32. The phase controller 32 during the unbalance measuring cycle serves as a phase comparator or a sensor developing phase comparison information, which is stored or preserved so that the phase controller 32 can be said to have a memory function also. Then during the indexing cycle the phase controller 32 serves as a phase shifter. The phase controller 32 is of known construction and is commercially available. General Electric's polarized vane power factor meter, type AB-18, is one of such commercially available instruments and will indicate phase angle.

Because of its commercial availability a detailed description of the controller 32 is not deemed necessary except to briefly explain its structure insofar as it relates to the invention. The controller 32 includes a single winding 34, which is energized by the unbalance signal through an unbalance switch 36, and two quadrature related windings 38 and 40, which communicate with the two-phase reference generator 26 through a control switch 42. The quadrature related windings 38 and 40 incorporate a mixing network 44 consisting of a resistor 46 and a capacitor 48. The function of the mixing network 44 will be described subsequently during the description of the indexing cycle. The controller 32 also includes a movable vane 50 positioned within the magnetic fields of the single winding 34 and the quadrature related windings 38 and 40. The movable vane 50 is formed of a magnetic material and serves somewhat as a transformer core, as will be explained. Movable with the vane 50 is a pointer 52 which indicates angular amounts expressed on a dial 54.

It should be kept in mind that during the unbalance measuring cycle, the phase controller 32 provides an indication of the angular location of the unbalance in the workpiece 10 relative to some electrical zero reference or, as mentioned, imaginary reference point on the workpiece 10. It will, therefore, be appreciated that provision must be made for representing the angular degrees on the dial 54. This is the function of the quadrature related windings 38 and 40 and the two-phase reference signal since they together provide a rotating magnetic field that revolves at the rate of one revolution per turn of the workpiece 10 so that the 360° on the dial 54 correspond to the 360 electrical degrees of one cycle. The square wave shaped unbalance signal produces a synchronously reversing magnetic field that interacts with the rotating magnetic field and causes the movable vane 50 to be deflected an amount corresponding, in effect, to the difference between the phase angles of the unbalance and reference signals.

This operation of the controller 32 can be explained somewhat differently by considering the conditions at one instant of time and while recognizing that both the unbalance signal and the two-phase reference signal have the same frequency. Then at any one instant of time the magnetic field from the winding 34 and the magnetic field from the quadrature related windings 38 and 40 will have some certain relationship that will be repeated for every revolution of the workpiece 10. The vane 50 in serving as a core has a magnetic field induced therein by the unbalance signal and it causes the vane 50 to align itself accordingly with the field resulting from the reference signal excitation of the quadrature related windings 38 and 40 at the instant of maximum vane magnetism. The position, therefore, of the vane 50 corresponds to the exact location of the unbalance relative to the imaginary reference point. The dial 54 visually portrays this imaginary reference point because of the mentioned action of the rotating magnetic field. This position of the vane 50 is retained after the excitation of the windings 34, 38 and 40 is removed since there is no force acting upon the vane 50 or so long as the phase relationship between the unbalance and reference signals stays constant. Hence, the memory function results with the information being retained for use during the indexing cycle.

With the phase controller 32 serving its memory function the indexing cycle is initiated, preferably automatically, by the cycle controller 14. The controller 14 may be in the form of a timer that, after a fixed time interval adequate for the unbalance measuring cycle to be completed, causes the motor control switch 24, the unbalance signal switch 36 and the control switch 42 to be opened and a correction switch 55 to be closed so as to connect the quadrature related windings 38 and 40 to the input of an amplifier 56.

It is essential during the indexing cycle to know the position of the workpiece 10, and this is the purpose of a position sensor or resolver, desgnated generally by the numeral 58. The resolver 58 may be of the conventional so-called synchro type construction and has a stator winding 60 and quadrature related armature windings 62. The stator winding 60 is energized through a resolver control switch 64 by a single-phase sixty-cycle reference voltage source 66. The resolver control switch 64 is closed by the cycle controller 14 when the indexing cycle of operation is initiated. The rotation of the armature windings 62 is through the agency of a servomotor 68, which is connected by suitable reduction gearing 70, if needed, and by a clutch 72 to the gearing 25. The clutch 72 may be of any known type and is engaged at the beginning of the indexing cycle by the cycle controller 14. Consequently, rotation of the gearing 25 by the servomotor 68 causes synchronous rotation of the armature windings 62 and the workpiece 10. The armature windings 62, as illustrated, have their center point grounded and their ends connected through an RC type mixing network 74. The function of the mixing network 74 is to provide at an output junction 75, which is connected to the winding 34 of the phase controller 32, an algebraic summation of the sine and cosine related voltages generated in the armature windings 62 by the field from the stator winding 60. With the proper choice of parameters the desired constant amplitude output is developed and is of a phase determined by the relative positions of the armature windings 62 and the stator winding 60. With the stator winding 60 being energized by a reference voltage that represents the position of the unbalance correction mechanism 12 and with the armature windings 62 reflecting the position of the aforementioned imaginary reference point on the workpiece 10, the phase of the output will indicate the position of this reference point on the workpiece 10 relative to the unbalance correction mechanism 12, and this information is now made available to the phase controller 32.

As has been explained, the phase controller 32 during the indexing cycle of operation becomes a phase shifter. In effect, the phase controller 32 performs as a variable coupling transformer, with the single winding 34 serving as a primary, and the quadrature related windings 38 and 40 functioning as a secondary. The coupling between the windings 34 and 38, 40 is established by the position of the movable vane 50. Consequently, the voltage applied to the winding 34 is phase shifted the pre-established amount, which as has been explained corresponds to the angular location of the unbalance in the workpiece 10 relative to the imaginary reference point by the coupling action. Since the mixing network 44 serves the same function as the mixing network 74 for the resolver 58, a constant amplitude output error signal is obtained of a phase that now takes into consideration and reflects the position of the unbalance correction mechanism 12 relative to both the positions of the unbalance and the imaginary reference point on the workpiece 10. The position of the unbalance will have to take into consideration the intended mode of correction. For example, if the unbalance correction is to be performed by drilling, the heavy side of the workpiece 10 would be drilled; whereas if material is to be added, it would be attached to the light side.

The error signal derived in this way may be somewhat weak. Hence, it is increased to a more acceptable level by an amplifier 56.

At this point it is possible to use the alternating error signal to directly operate the servomotor 68 if the servomotor is of a character that responds to the phase of an A.C. error signal; or if preferred the error signal can be converted to a D.C. voltage by a suitable phase sensitive rectifier 76, such as disclosed in United States Patent No. 2,988,918 to King. This phase sensitive rectifier 76 preferably uses the single-phase reference voltage from the source 66 to synchronously rectify the error signal and develop a D.C. error signal having the same information as the A.C. error signal; i.e., the D.C. error signal represents the angular location of the unbalance relative to the unbalance correction mechanism 12. It is mentioned here that when the A.C. error signal and the reference voltage are 90° out of phase a null will be obtained. This 90° phase difference is easily built into the system in a known way, e.g., the unbalance correction mechanism 12 can be located accordingly. The imaginary reference points could also take this into consideration, or even the housing of the resolver 58 can be adjusted.

The D.C. error signal is transferred to a servo amplifier 78 and then to the servomotor 68. The servomotor 68 is of any type that will respond to the D.C. error signal and rotate through the reduction gearing 70, and the clutch 72, both the resolver armature windings 62, and the workpiece 10 until the error signal is nulled. At this time the proper alignment will be established between the workpiece 10 and the unbalance correction mechanism 12 for making the unbalance correction. Again, the cycle controller 14 in any suitable way can initiate the operation of the unbalance connection mechanism 12 merely by allowing the proper amount of time for the nulling to take place.

The information about the amount of the unbalance can be derived from the unbalance signal and stored in an appropriate memory 80 until the correction is made. United States Patent No. 3,228,264 to Trimble, issued Jan. 11, 1966, discloses structure that can be used for this purpose.

Summarizing now the operation of the balancing system, the cycle controller 14 is first placed in the measurement setting in which the motor control switch 24 is closed to start the operation of the drive motor 18. The unbalance pickup 28 will sense the unbalance and develop an unbalance signal of a sinusoidal wave form, which will include information relative to location of this unbalance and the amount. The amount information is stored in the memory 80 while the pulse shaping network 30 is utilized to develop a square wave output containing the unbalance location information.

In initiating the unbalance measuring cycle the unbalance signal switch 36 and the control switch 42 are both closed. This step renders the phase controller 32 operative. Thus, in effect the magnetic field of the single winding 34 reflects the location of the unbalance, and the rotating field produced by the application of the two-phase reference signal from the two-phase generator 26 to the quadrature related windings 38 and 40 serves as a reference. Therefore, as explained, the magnetic vane 50 will line up with the position of the reference magnetic field at the instant of maximum vane magnetism produced by the unbalance signal and thereafter holds this position, thus storing and, if wanted, visually indicating the angular location of the unbalance relative to this reference point, all within a 360° range. This completes the unbalance measuring cycle.

With the unbalance measuring cycle completed and the time allowed therefor elapsed, the cycle controller 14 will move to its position for establishing the indexing cycle of operation, thus opening the motor control switch 24, energizing the clutch 72, closing the correction switch 55 to connect the output of the phase controller 32 to the amplifier 56, and closing the resolver control switch 64. The resolver 58 performs its position function by applying to the phase controller winding 34 a voltage of a phase reflecting the position of the reference point on the workpiece 10 relative to the unbalance correction mechanism 12. This voltage is shifted by the resultant transformer coupling action of the prior positioned magnetic vane 50 and the resultant error signal is synchronously rectified by the phase sensitive rectifier 76 before being applied to the servomotor 68. There follows a period of adjusting and locating of the workpiece 10 until the error signal is nulled, whereupon the servomotor 68 will stop.

Now the cycle controller 14 can initiate the operation of the unbalance correction mechanism 12 to make the unbalance correction at this established location.

From the foregoing it will be appreciated that the phase controller 32 accomplishes actually three functions: phase comparing, memorizing, and finally phase shifting. This is done without slip rings and moreover no pulsing or D.C. circuits are involved. The pulse shaping network 30 locks in on the frequency of sinusoidal shaped unbalance signal from the unbalance pickup 28, regardless of how weak it is, and converts the unbalance signal into a symmetrically shaped square wave of the same ferquency and phase as the sinusoidal shaped unbalance signal so as to preserve the information about the angular location of the unbalance relative to the imaginary reference point. Then too, accurate unbalance angle measurements are made within a complete 360° range.

The invention is to be limited only by the following claims.

What is claimed is:

1. In a balancing system, the combination of an unbalance correction mechanism, means maneuvering a workpiece and the unbalance correction mechanism relative to each other in response to an error signal, means developing an unbalance signal having a phase corresponding to the angular position of the unbalance in a rotating body and a frequency corresponding to the rotational speed of the body, and phase comparing means including winding means developing a magnetic field that rotates in synchronism with the body, a movable member formed of magnetic material, stationary winding means responsive to the unbalance signal for magnetizing the movable member so that the movable member will align itself with the rotating magnetic field and remain so aligned and in a position corresponding to the angular position of the unbalance in the body when the magnetization of the movable member and the rotating magnetic field are removed, and means removing the magnetization of the movable member and the rotating magnetic field and developing a position signal corresponding to the relative positions of the workpiece and the unbalance correction mechanism for supply to one of the winding means so as to develop in the other winding means for supply to the maneuvering means an output error signal reflecting the coupling established between the winding means by the positioning of the movable member and accordingly corresponding to the actual position of the unbalanced portion of the workpiece relative to the unbalance correction mechanism.

2. In a balancing system, the combination of means developing an unbalance signal of a sinusoidal wave shape having a phase corresponding to the angular location of the unbalance in a rotating workpiece and a frequency corresponding to the rotational speed of the workpiece, means developing a polyphase reference output also having a frequency corresponding to the rotational speed of the body, means sensing the phase angle difference between the reference output and the unbalance signal so as to determine the angular location of the unbalance in the workpiece, the sensing means including a stationary polyphase winding responsive to the polyphase reference output for generating a rotating magnetic field of 360 electrical degrees, a movable vane of magnetic material, and a stationary polarizing winding means responsive to the unbalance signal for inducing in the movable vane a magnetism that alternates in phase with the unbalance signal so that the vane will align with the position of the rotating magnetic field at the instant of maximum vane magnetism and in a position corresponding to the phase difference between the phase angles of the unbalance signal and the polyphase reference signal.

3. In a balancing system, the combination of means developing an unbalance signal of a sinusoidal wave shape having a phase corresponding to the unbalance in a rotating workpiece and a frequency corresponding to the rotational speed of the workpiece, bistable means responsive to the frequency of the unbalance signal for changing the unbalance signal to a symmetrical square wave shape, means developing a polyphase reference output also having a frequency corresponding to the rotational speed of the workpiece, and means sensing the phase angle difference between the reference output and the unbalance signal so as to determine the location of the unbalance in the workpiece, the sensing means including a stationary polyphase winding responsive to the polyphase reference output for generating a rotating magnetic field of 360 electrical degrees, a movable vane of magnetic material, and a stationary polarizing winding responsive to the unbalance signal for inducing in the movable vane a magnetism that alternates in phase with the unbalance signal so that the movable vane will align with the position of the rotating magnetic field at the instant of maximum vane magnetism and in a position corresponding to the difference between the phase angles of the polyphase reference output and the unbalance signal.

4. In a balancing system, the combination of an unbalance correction mechanism, means maneuvering a workpiece and the unbalance correction mechanism relative to each other in response to an error signal, stationary winding means developing a reference magnetic field that rotates in synchronism with a rotating body, a stationary polarizing windings, means generating an unbalance magnetic field reflecting the position of the unbalance in the body, a movable member so arranged as to be magnetized by the unbalance magnetic field and align itself with the reference magnetic field at the instant of a certain degree magnetism and remain so aligned and in a position corresponding to the angular location of the unbalance on the rotating body after the magnetization of the movable member and the rotating magnetic field are removed, and means removing the magnetization of the movable member and the rotating magnetic field and developing a position signal corresponding to the relative positions of the workpiece and the unbalance correction mechanism for supply to one of the winding means so as to develop in the other winding means for supply to the maneuvering means an output error signal reflecting the coupling established between the winding means by the positioning of the movable member and accordingly corresponding to the actual position of the unbalanced portion of the workpiece relative to the unbalance correction mechanism.

5. An angle of unbalance determining mechanism comprising, in combination, stationary winding means generating a reference magnetic field that revolves in synchronism with a rotating body, means generating a sinusoidal wave shaped unbalance signal of a phase reflecting the angular position of the unbalance in the body and of a frequency corresponding to the rotational speed of the body, a bistable multivibrator responsive to the frequency of the unbalance signal for changing the unbalance signal to a symmetrical square wave shape, stationary polarizing winding means responsive to the unbalance signal for generating a corresponding unbalance magnetic field, and movable means responsive to the unbalance magnetic field for alignment with the reference magnetic field when the unbalance signal is of a certain value and remain so aligned and in a position corresponding to the angular location of the unbalance in the rotating body after the reference and unbalance magnetic fields have been removed.

6. In a balancing system, the combination of an unbalance correction mechanism, means maneuvering a workpiece and the unbalance correction mechanism relative to each other in response to an error signal, means producing a polyphase output having a frequency corresponding to the rotational speed of the body, means developing an unbalance signal of symmetrical wave shape having a frequency also corresponding to the speed of rotation of the body and a phase corresponding to the angular location of the unbalance, a stationary polyphase winding responsive to the polyphase output and so arranged as to provide a rotating magnetic field that revolves once per each revolution of the rotating body, a stationary unbalance winding responsive to the unbalance signal for providing an unbalance magnetic field, a movable member magnetically responsive to the unbalance magnetic field and so arranged as to align itself with the rotating magnetic field at the instant of maximum magnetism and remain so aligned and in a position corresponding to the angular position of the unbalance after the magnetization of the movable member and the rotating magnetic field are removed, and means removing the magnetization of the movable member and the rotating magnetic field and developing a position signal corresponding to the relative positions of the workpiece and the unbalance correction mechanism for supply to one of the windings so as to develop in the other winding for supply to the maneuvering means an output error signal reflecting the coupling established between the windings by the positioning of the movable member and accordingly corresponding to the actual position of the unbalanced portion of the workpiece relative to the unbalance correction mechanism.

7. In a balancing system, the combination of an unbalance correction mechanism, means maneuvering a workpiece and the unbalance correction mechanism relative to each other in response to an error signal, means developing a polyphase reference output of a phase angle reflecting a reference position on a rotating body and of a frequency corresponding to the rotational speed of the body, means developing an unbalance signal of symmetrical wave form having a phase angle reflecting the angular position of the unbalance and a frequency also corresponding to the rotational speed of the body, and means comparing the phases of the unbalance and reference signals, the phase comparing means including a polyphase winding responsive to the polyphase reference output for providing a rotating magnetic field that revolves once for each revolution of the body and accordingly reflects a reference position on the body, a winding responsive to the unbalance signal for producing an unbalance magnetic field reflecting the angular position of the unbalance, a movable vane of magnetic material so arranged as to be magnetized by the unbalance magnetic field and align with the position of the rotating magnetic field at the instant of maximum vane magnetism and remain so aligned and in a position corresponding to the angular position of the unbalance relative to the reference position after the magnetization of the movable member and the rotating magnetic field are removed, and means removing the magnetization of the movable vane and the rotating magnetic field and developing a position signal corresponding to the relative positions of the workpiece and the unbalance correction mechanism for supply to one of the windings so as to develop in the other winding for supply to the maneuvering means an output error signal reflecting the coupling established between the windings by the positioning of the movable member and accordingly corresponding to the actual position of the unbalanced portion of the workpiece relative to the unbalanced correction mechanism.

8. In a balancing system, the combination of an unbalance correction mechanism, means maneuvering a workpiece and the unbalance correction mechanism relative to each other in response to an error signal so that an unbalance correction can be made in the workpiece, means responsive to the rotation of the workpiece for developing a position signal corresponding to the relative positions of the workpiece and the unbalance correction mechanism, and memory means including a stationary input winding energized by the position signal, a stationary output winding, and a magnetic member having a certain position relative to the windings so as to cause ing means including means generating an unbalance signal of a symmetrical wave shape having a phase corresponding to the angular position of the unbalanced portion of the workpiece and a frequency corresponding to the rotational speed of the workpiece; and means generating a polyphase reference output having a frequency also corresponding to the rotational speed of the workpiece and a phase reflecting the angular location of the reference point on the workpiece; indexing means operative during the indexing cycle to align the workpiece and the unbalance correction mechanism so that the unbalance correction can be made; the indexing means includng means generating a position signal corresponding in phase to the relative angular positions of the reference point on the workpiece and unbalance correction mechanism, motor means revolving the workpiece, and means controlling the motor means in response to an error signal; and phase control means adapted to perform as a phase comparator during the unbalance measuring cycle and a phase shifter during the indexing cycle; the phase control means including a single stationary winding, a stationary polyphase winding, and a magnetic vane so arranged as to be movable relative to the windings, the windings being so constructed and arranged relative to each other and the magnetic member that during the unbalance measuring cycle the single winding is energized by the unbalance signal to produce an unbalance magnetic field for magnetizing the vane and the polyphase winding is energized by the reference output to produce a magnetic field that revolves once for each revolution of the workpiece thereby causing the vane to align with the position of the rotating magnetic field at the instant of maximum vane magnetism in a position reflecting the angular location of the unbalanced portion relative to the reference point on the workpiece, and during the indexing cycle the single winding is energized by the position signal so as to induce in the polyphase winding an output error signal for supply to the controlling means having a phase reflecting the coupling established between the windings by the positioning of the magnetic vane during the unbalance measuring cycle and accordingly corresponding to the angular position of the unbalance porton of the workpiece relative to the unbalance correction mechanism.

References Cited by the Examiner

UNITED STATES PATENTS

| | | | |
|---|---|---|---|
| 2,167,488 | 7/1939 | Ohlson | 73—462 |
| 2,467,729 | 4/1949 | Bush | 324—90 |
| 2,783,648 | 3/1957 | Stovall et al. | 73—462 |
| 2,933,984 | 4/1960 | Hack | 73—463 X |
| 3,211,009 | 10/1965 | Lucka | 73—462 |

FOREIGN PATENTS 893,197   4/1962   Great Britain.

OTHER REFERENCES

German printed application 1,071,373, Hilgers, December 1959.

RICHARD C. QUEISSER, *Primary Examiner.*

J. J. GILL, *Assistant Examiner.*